(12) United States Patent
Johnson

(10) Patent No.: US 7,256,736 B2
(45) Date of Patent: Aug. 14, 2007

(54) LOCATION SYSTEM WITH SWEPT DIGITAL BEACON

(75) Inventor: Michael J. Johnson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 11/201,506

(22) Filed: Aug. 11, 2005

(65) Prior Publication Data

US 2007/0035443 A1 Feb. 15, 2007

(51) Int. Cl.
*G01S 1/08* (2006.01)

(52) U.S. Cl. ............................... 342/386; 342/457

(58) Field of Classification Search ............... 342/386, 342/457, 463–465; 455/456.1, 456.3, 456.6, 455/457
See application file for complete search history.

(56) References Cited

U.S. PATENT DOCUMENTS

| | | | |
|---|---|---|---|
| 3,735,407 A | 5/1973 | Meyer | |
| 5,469,193 A * | 11/1995 | Giobbi et al. | ............... 345/158 |
| 5,706,510 A | 1/1998 | Burgoon | |
| 5,844,522 A * | 12/1998 | Sheffer et al. | ............... 342/457 |
| 5,903,373 A * | 5/1999 | Welch et al. | ............... 398/128 |
| 6,026,402 A | 2/2000 | Vossen et al. | |
| 6,098,072 A | 8/2000 | Sluiman et al. | |
| 2002/0095479 A1 | 7/2002 | Schmidt | |
| 2003/0187822 A1 | 10/2003 | Lefurgy et al. | |
| 2005/0105600 A1 * | 5/2005 | Culum et al. | ............... 375/150 |

* cited by examiner

*Primary Examiner*—Dao Phan
(74) *Attorney, Agent, or Firm*—Jeanine Ray-Yarletts, Esq.; Steven M. Greenberg, Esq.; Carey Rodriguez Greenberg & Paul LLP

(57) ABSTRACT

A detection system includes a fixed-position transmitter and a mobile unit. The transmitter digitally transmits a data packet including angle information associated with the transmitter, and the mobile unit includes a receiver for receiving the transmitted data packet. The mobile unit is configured to detect a plurality of data packets from a single transmitter, the plurality of data packets including non-identical angle information. The mobile also determines new angle information from the non-identical angle information in the plurality of data packets and determines a location of the mobile unit relative to the transmitter using the new angle information. Also, the mobile unit is configured to indicate information associated with the determined location to a user.

19 Claims, 2 Drawing Sheets

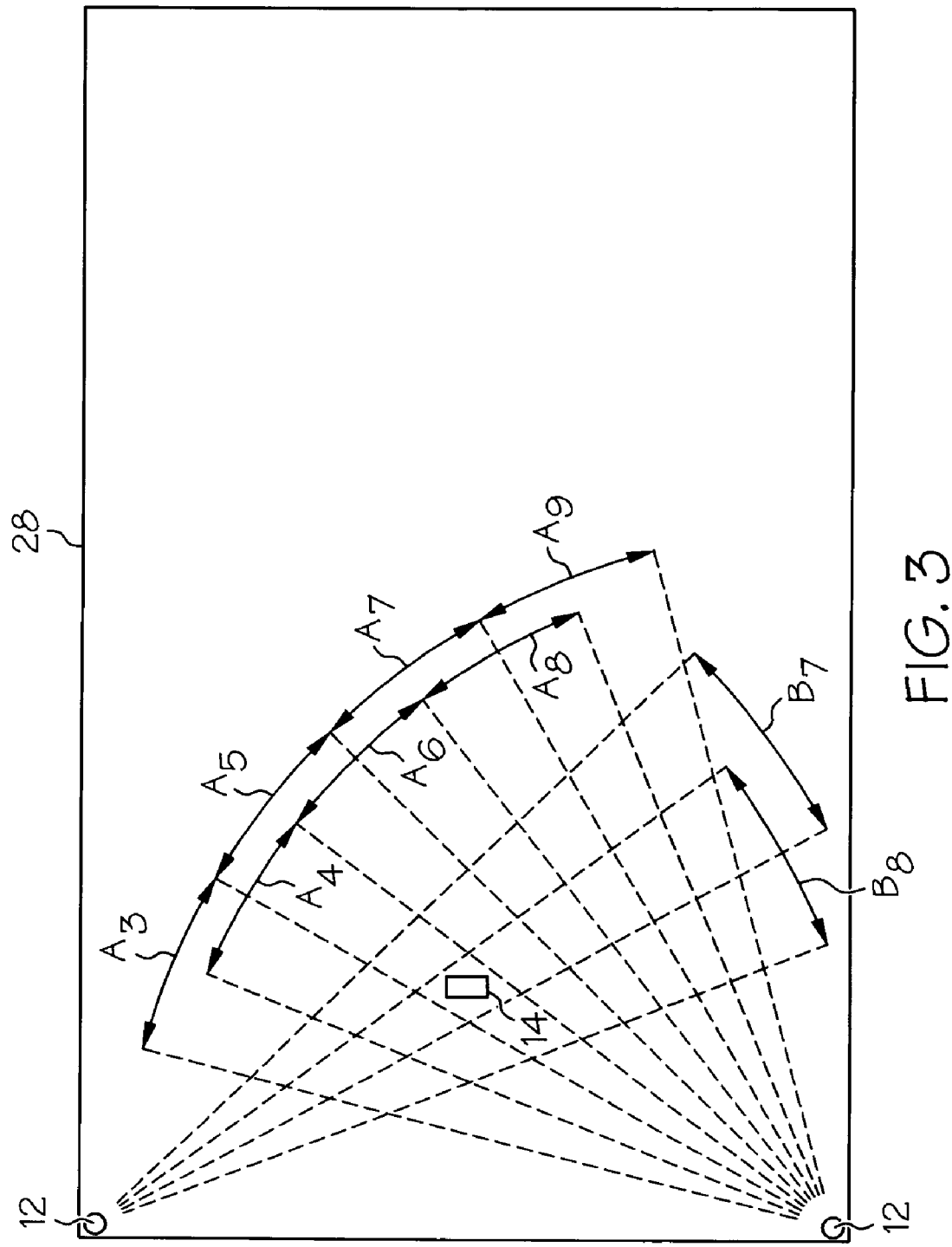

LOCATION SYSTEM WITH SWEPT DIGITAL BEACON

BACKGROUND OF THE INVENTION

1. Field of the Invention

The disclosure relates generally to location systems and, more specifically, to a location system using fixed transmitters and a mobile receiver.

2. Description of the Related Art

Many software applications are of increased value to a user if the user's location can be accurate known. For example, based upon the location of a shopping cart in a grocery store, the software application can help the user find items on a shopping list or let the user know about discounts available on nearby items. However, equipping the shopping cart with a location system adds significant costs to the infrastructure (e.g., a retail associated) with which the shopping cart is associated.

Certain existing technology allows for a location to be determined through the use of wireless transceivers in the shopping cart/mobile unit coupled with wireless access points in the infrastructure. The location is determined based upon strengths of a signal received by the wireless transceivers from the wireless access points. This technology, however, has not proven to be accurate and repeatable in certain environments, such as a retail store. There is, therefore, a need for a location system that can be used to determine a location of a mobile unit in a defined area, such as a retail store, that reduces the need for installation of additional hardware within the infrastructure while providing improved accuracy in determining the location of the mobile unit.

BRIEF SUMMARY OF THE INVENTION

Embodiments of the invention address deficiencies of the art in respect to location systems and provide a novel and non-obvious system, method, program and mobile unit for determining a location of the mobile unit. The detection system includes a fixed-position transmitter and a mobile unit. The transmitter digitally transmits a data packet including angle information associated with the transmitter, and the mobile unit includes a receiver for receiving the transmitted data packet. The mobile unit is configured to detect a plurality of data packets from a single transmitter, the plurality of data packets including non-identical angle information. The mobile also determines new angle information from the non-identical angle information in the plurality of data packets and determines a location of the mobile unit relative to the transmitter using the new angle information. Also, the mobile unit is configured to indicate information associated with the determined location to a user.

In certain aspects, the detection system includes a plurality of fixed-position transmitters with each transmitter digitally transmitting a respective data packet including angle information. The mobile unit is configured to calculate a two-dimensional or three-dimensional location of the mobile unit relative to the plurality of transmitters based upon the new angle information determined from the plurality of respective data packets.

In additional aspects, the transmitter transmits the data packet within a broadcast angle. Additionally, the transmitter sequentially steps the broadcast angle by a stepping angle, and the stepping angle is less than or equal to one-half the broadcast angle.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 3 is plan view of the location system with a mobile unit and multiple transmitters.

DETAILED DESCRIPTION OF THE INVENTION

Figure 1:
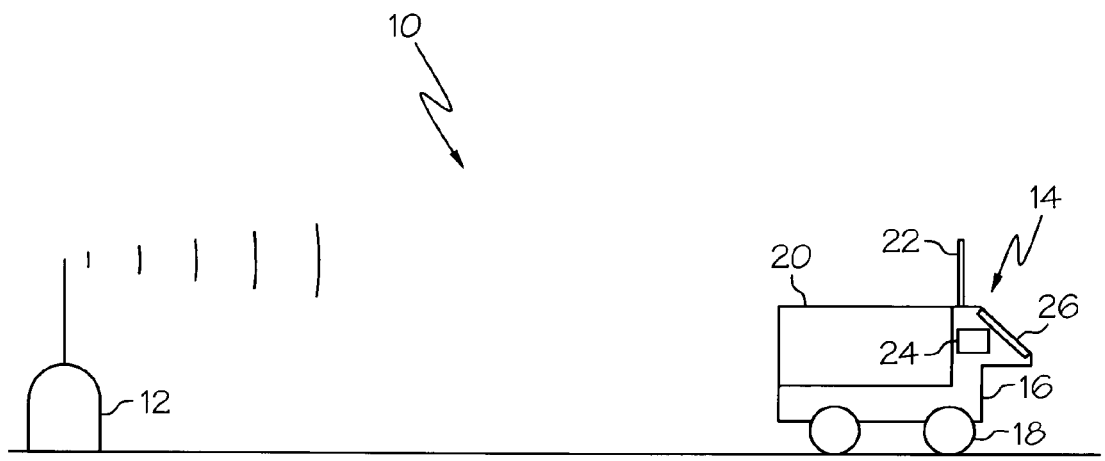
FIG. 1 is a schematic illustration of a location system in accordance with the inventive arrangements.

FIG. 1 illustrates a location system 10 for determining a location of a mobile unit 14. The location system 10 includes one or more transmitters 12 that digitally transmit a data packet that includes angle information associated with the respective transmitter 12. The mobile unit 14 includes a receiver for receiving the transmitted data packet, and the receiver may include an antenna 22, a computer system 24, and an input/output device 26.

The mobile unit 14 may be attached to a movable cart 16. The attachment of the mobile unit 14 to the cart 16 may be permanent. Alternatively, mobile unit 14 receiver may be removably detachable from the cart 16 such that the mobile unit 14 may be moved from one cart and attached to another cart. The location system 10 is not limited as to a particular type of cart 16 to which the mobile unit 14 is attached. In certain aspects of the detection system 10, the cart 16 may be used to store items. In this manner, the cart 16 may include a basket 20 for receiving items. Also, the manner in which the cart 16 is movable is not limited. However, in certain aspects of the detection system 10, the cart 16 includes wheels 18.

The computer system 24 controls the operation of the input/output system 26 and receives the digital data packets from the transmitter(s) 12 using the antenna 22. The mobile unit 14 is not limited to a particular type of computer system 24 or where the computer system 24 is located. For example, the computer system 24, or portions thereof, may be located remote from the mobile unit 14 and/or portions of the computer system 24 may be included within the mobile unit 14.

Many types of input/output devices 26 are capable of being used with the mobile unit 14, and the present mobile unit 14 is not limited as to a particular type of input/output devices 26. For example, the input/output device 26 may be separate devices, such as a keypad and a video display, or the input/output device 26 may be combined into a single unit, such as a video touchpad.

Figure 2:
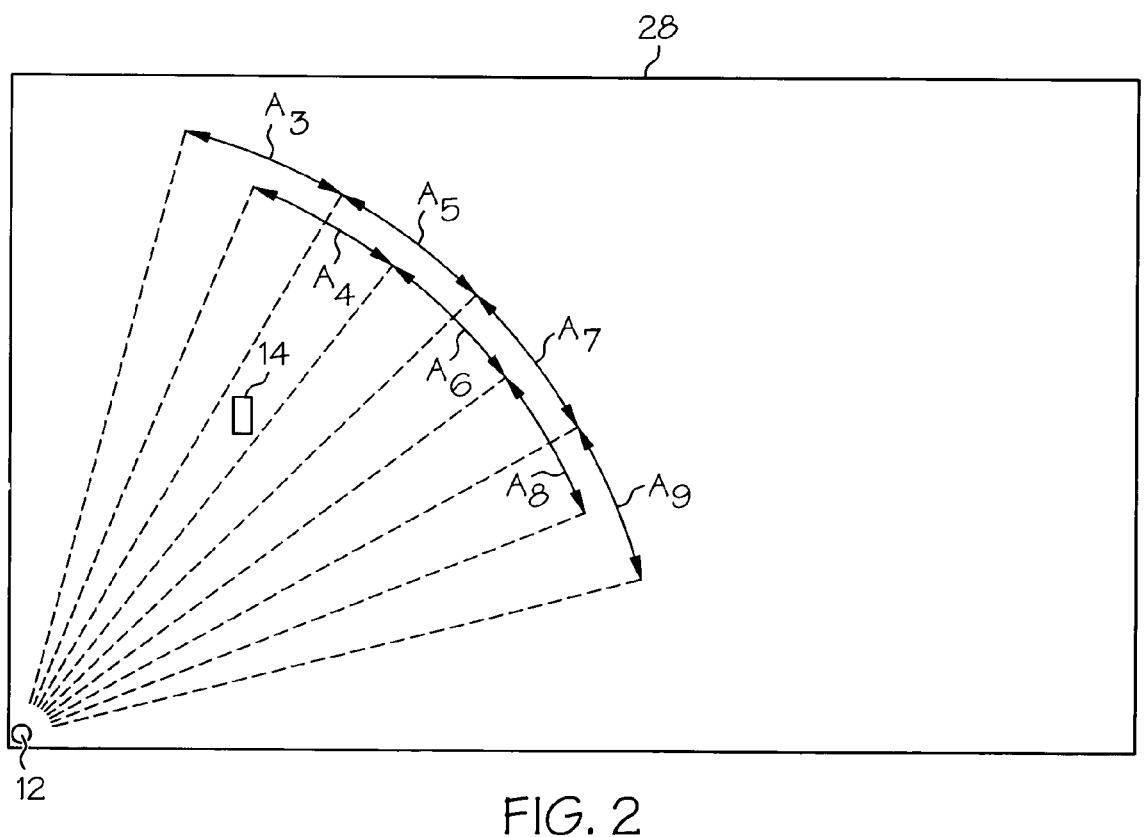
FIG. 2 is plan view of the location system with a mobile unit and a single transmitter.

Referring to FIG. 2, the transmitter 12 digitally transmits a data packet over a given angle of transmission or broadcast angle A. Upon the mobile unit 14 being within the area encompassed by the broadcast angle A, the mobile unit 12 is able to receive the data packet transmitted by the transmitter 12. Otherwise, the mobile unit 12 does not receive the transmission.

The transmitter 12 is configured to broadcast the data packet by stepping the broadcast angle using a stepping angle. Although the location system 10 is not limited in the manner in which the broadcast angle A is incrementally stepped, the stepping can be accomplished via, for example, with a IC-fabricated phased array antenna in which the direction of the broad signal can be selected by applying a DC offset. This allows the coverage area, i.e., the area within the broadcast area A, to be dynamically and electronically shaped/tuned, for example, using software control of a digital output port and a digital-to-analog converter.

By way of example, the broadcast angle A illustrated in FIG. 1 is 15° and the stepping angle is 7.5°. Thus, broadcast angle A3 encompasses 60-75°, broadcast angle A4 encompasses 67.5-52.5°, and broadcast angle A5 encompasses 60-45° relative to the transmitter 12. For each different broadcast angle A, the data packet transmitted by the transmitter 12 includes angle information associated with the specific broadcast angle A. For example, upon transmitting broadcast angle A4, the data packet transmitted includes information, when received by the mobile unit 14, is interpreted by the mobile unit 14 as indicating that the data packet was transmitted only in broadcast angle A4 and that the mobile unit 14 is located within broadcast angle A4.

The specifics of the type of angle information contained within the data packet is not limited. For example, the angle information may include a reference angle common to all broadcast angles A and an offset angle relative to the reference angle. Alternatively, the mobile unit 14 may be already be programmed with the reference angle and only an offset angle is provided within the data packet. Yet another alternative involves including just the angle name. For example, broadcast angles A1-A9 may be referenced as 1-9, A-I, or use some other convention that the mobile unit 14 recognizes as designating a particular broadcast angle A. As will be discussed in more detail below in reference to FIG. 3, when multiple transmitters 12 are used, the angle information may also include information that indicates the particular transmitter 12 from which the data packet originated.

The accuracy of location system 10 in locating the position of the mobile unit 14 is based, in part, upon the ratio of the broadcast angle A to the stepping angle. By having a stepping angle less than the broadcast angle A, the location system 10 is able to provide greater accuracy in locating the position of the mobile unit than if the stepping angle was equal to the broadcast angle A. In particular, the accuracy of the location system 10 is not necessarily limited by the size of the broadcast angle A; instead, the accuracy may be based on the stepping angle.

By way of example, the mobile unit 14 in FIG. 2 receives data packets when the transmitter is transmitting in broadcast angles A4, A5. The mobile unit 14 then determines that the position of the mobile unit 14 is a function of broadcast angles A4, A5. The location system 10 is not limited as to the particular function used to determine the location of the mobile unit 14. For example, the function may be simple averaging or a more complex calculation, such as one incorporating the prior history of angle data. Depending upon the overlap between broadcast angles A, the mobile unit may receive a data packet that indicates the mobile unit 14 is within one, two, or more broadcast angles A. If the mobile unit 14 receives two or more different data packets indicating that the mobile unit 14 is within two or more broadcast angles A, the function may use the angle information from each of the different data packets received by the mobile unit 14.

Upon the location system 10 determining a location of the mobile unit 14 within a defined area 28, such as a store, the mobile unit 14 may indicate to the user particular information associated with the determined location. For example, a user may inquire about particular products associated with the determined location, such as requesting information on any products being discounted in the determined location.

Referring to FIG. 3, multiple transmitters 12 may be used to determine a location of the mobile unit 14 within the defined area 28. Each transmitter 12 digitally transmits a data packet including angle information associated with the particular transmitter 12. Upon the mobile unit 14 receiving the transmitted data packet, the mobile unit is able to determine from the data packet: (i) the particular transmitter 12 from which the data packet originated and (ii) the angle information associated with the transmitter 12. When this information is obtained from two or more transmitters, the location of the mobile unit 14 can be determined with greater accuracy. For example, the location of the mobile unit 14 in FIG. 3 may be defined as the intersection between the average of broadcast angles A4, A5 and the average of broadcast angles B7, B8.

With three or more transmitters 12, a 3-dimensional location of the mobile unit 14 may also be determined. In addition to, or alternatively, upon the use of additional transmitters 12 that are capable of being detected by the mobile unit 14, the location of the mobile unit 14 can be determined with greater accuracy. The location system 10 is not limited as to the particular function used to determine the location of the mobile unit 14 based on the angle data associated with the multiple transmitters 12. For example, with three or more transmitters 12, the function may involve known techniques for over-determined systems, such as a least-squares calculation.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A detection system, comprising:
   a fixed-position transmitter for digitally transmitting a data packet including angle information associated with the transmitter; and a mobile unit including a receiver for receiving the transmitted data packet, wherein the mobile unit is configured to detect a plurality of data packets from a single transmitter, the plurality of data packets including non-identical angle information, determine new angle information from the non-identical angle information in the plurality of data packets, and determine a location of the mobile unit relative to the transmitter using the new angle information.

2. The detection system according to claim 1, wherein detection system includes a plurality of fixed-position transmitters, each of the plurality of transmitters digitally transmitting a respective data packet including angle information.

3. The detection system according to claim 1, wherein the mobile unit is configured to calculate a three-dimensional location of the mobile unit relative to the plurality of transmitters.

4. The detection system according to claim 1, wherein the mobile unit is configured to indicate information associated with the determined location to a user.

5. The detection system according to claim 1, wherein the transmitter transmits the data packet within a broadcast angle.

6. The detection system according to claim 5, wherein the transmitter sequentially steps the broadcast angle by a stepping angle.

7. The detection system according to claim 6, wherein the stepping angle is less than or equal to one-half the broadcast angle.

8. A mobile unit for receiving a transmitted data packet including angle information from a fixed-position transmitter, wherein the mobile unit is configured to detect a plurality of data packets from a single transmitter, the plurality of data packets including non-identical angle information associated with the single transmitter, determine new angle information from the non-identical angle information in the plurality of data packets, and determine a location of the mobile unit relative to the transmitter using the new angle information.

9. The mobile unit according to claim 8, wherein the mobile unit is configured to calculate a three-dimensional location of the mobile unit relative to a plurality of fixed-position transmitters.

10. The mobile unit according to claim 8, wherein the mobile unit is configured to indicate information associated with the determined location to a user.

11. The mobile unit according to claim 8, wherein the transmitter transmits the data packet within a broadcast angle.

12. A method for determining a location of a mobile unit, comprising the steps of:

receiving a transmitted data packet including angle information from a fixed-position transmitter and associated with the transmitter;

detecting a plurality of data packets from a single transmitter, the plurality of data packets including non-identical angle information associated with the single transmitter, determining new angle information from the non-identical angle information in the plurality of data packets, and determining a location of the mobile unit relative to the transmitter using the new angle information.

13. The mobile unit according to claim 12, wherein the mobile unit is configured to calculate a three-dimensional location of the mobile unit relative to a plurality of fixed-position transmitters.

14. The mobile unit according to claim 12, wherein the mobile unit is configured to indicate information associated with the determined location to a user.

15. The mobile unit according to claim 12, wherein the transmitter transmits the data packet within a broadcast angle.

16. A computer program product comprising a computer useable medium including a computer readable program, wherein the computer readable program when executed on a computer causes a location system to determine a location of a mobile unit, comprising the steps of:

receiving a transmitted data packet including angle information from a fixed-position transmitter and associated with the transmitter;

detecting a plurality of data packets from a single transmitter, the plurality of data packets including non-identical angle information, determining new angle information from the non-identical angle information in the plurality of data packets, and determining a location of the mobile unit relative to the transmitter using the new angle information.

17. The computer program product according to claim 16, wherein the mobile unit is configured to calculate a three-dimensional location of the mobile unit relative to a plurality of fixed-position transmitters.

18. The computer program product according to claim 16, wherein the mobile unit is configured to indicate information associated with the determined location to a user.

19. The computer program product according to claim 16, wherein the transmitter transmits the data packet within a broadcast angle.

* * * * *